United States Patent [19]
Carlson et al.

[11] Patent Number: 6,136,890
[45] Date of Patent: *Oct. 24, 2000

[54] INK JET INK CONTAINING POLYURETHANE DISPERSANT

[75] Inventors: James G. Carlson, Lake Elmo; Steven T. Hedrick, Cottage Grove; Richard J. Kuo, St. Paul; Jeffrey T. Anderson, Lake Elmo, all of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/024,065

[22] Filed: Feb. 17, 1998

[51] Int. Cl.⁷ .............. C09D 11/02; C08L 75/04; C08G 18/71; C08G 18/72; C08G 18/24

[52] U.S. Cl. ................. 523/160; 528/58; 528/69

[58] Field of Search .................. 523/160, 161; 106/31.6; 528/58, 69

[56] References Cited

U.S. PATENT DOCUMENTS

| | | | |
|---|---|---|---|
| 4,094,842 | 6/1978 | Wenzel et al. | 528/67 |
| 4,129,455 | 12/1978 | Thompson et al. | 524/88 |
| 4,145,515 | 3/1979 | Pogozelski et al. | 370/482 |
| 4,203,875 | 5/1980 | Garner et al. | 524/873 |
| 4,237,250 | 12/1980 | Dietrich | 525/440 |
| 4,652,466 | 3/1987 | Thoma et al. | 427/244 |
| 4,812,492 | 3/1989 | Eckes et al. | 523/351 |
| 5,039,739 | 8/1991 | Padget et al. | 524/839 |
| 5,071,578 | 12/1991 | Ohkubo et al. | 252/62.54 |
| 5,393,799 | 2/1995 | De Vos et al. | 521/157 |
| 5,482,077 | 1/1996 | Serafin | 137/516.25 |
| 5,494,960 | 2/1996 | Rolando et al. | 524/591 |
| 5,637,639 | 6/1997 | Duan et al. | 524/591 |
| 5,691,425 | 11/1997 | Klein et al. | 525/455 |
| 5,700,851 | 12/1997 | Banning et al. | 523/161 |
| 5,703,158 | 12/1997 | Duan et al. | 524/840 |
| 5,772,746 | 6/1998 | Sawada et al. | 106/31.86 |
| 5,852,104 | 12/1998 | Kokel et al. | 524/591 |
| 5,886,091 | 3/1999 | Harris et al. | 524/590 |
| 5,969,002 | 10/1999 | Kijistra et al. | 523/160 |

FOREIGN PATENT DOCUMENTS

| | | | |
|---|---|---|---|
| 0 586 101 | 3/1994 | European Pat. Off. | C09D 11/00 |
| 0 616 017 | 9/1994 | European Pat. Off. | C09D 11/00 |
| 0 732 381 | 9/1996 | European Pat. Off. | C09D 11/00 |
| 0 827 973 | 3/1998 | European Pat. Off. | C08G 18/28 |
| WO 96/14925 | 5/1996 | WIPO | B01F 5/06 |
| WO 96/14941 | 5/1996 | WIPO | B05D 1/26 |

OTHER PUBLICATIONS

English Language Abstract

*Primary Examiner*—Vasu Jagannathan
*Assistant Examiner*—Callie E. Shosho
*Attorney, Agent, or Firm*—Melissa M. Hayworth

[57] ABSTRACT

Described are pigmented inks comprising a liquid medium, a pigment, and a polyurethane dispersant, the pigment being stabilized by the polyurethane dispersant, and the ink being suitable for use in an ink jet printer.

68 Claims, No Drawings

INK JET INK CONTAINING POLYURETHANE DISPERSANT

FIELD OF THE INVENTION

The present invention relates to pigmented inks, and in particular, such inks adapted for use with ink jet printing applications.

BACKGROUND

Ink jet printers involve the use of liquid-based inks that can be jetted onto a receptor, often a sheet of paper or film, to produce an image. The use of four basic ink colors (cyan, magenta, yellow, and black) in various combinations and concentrations allows virtually any color to be produced as part of a printed image. Ink jet technology is well-suited for high resolution graphic images, particularly those produced using digital printing systems. Such systems typically employ computer technology to create, modify, and store images, text, graphics, and the like.

Inks suitable for ink jet printing applications must meet requirements that can be quite different from inks used in other conventional printing technologies. The viscosity of ink jet inks must be relatively low, e.g., typically less than about 20 centipoise (cp). At the same time, ink jet inks preferably have a controlled surface tension to control droplet formation. The inks or their ingredients should not clog thermal or piezo print heads (e.g., at the nozzle) upon standing or during the printing process. And, the ink should dry quickly to a flexible and abrasion resistant image. Fast drying is important because it is a key factor in determining printer productivity.

Many inks used in the past with ink jet printers comprise dyes contained within carrier liquids. Although such inks may offer satisfactory performance in certain applications, dye-based ink systems can tend to produce images that lack light stability and durability properties needed for outdoor and similarly demanding applications.

Inks prepared with pigments as colorants instead of dyes have been considered. In pigmented inks, different colored pigments can be dispersed into pigmented dispersions for use in ink jet printers. Ink jet printheads employ extremely fine printhead nozzles. The size of the pigment particle must therefore be small, and the particle size distribution sufficiently narrow to avoid plugging of the nozzles by the pigment. Also, the pigment particles within the ink should be in a stable state of dispersion; the pigment particles should not agglomerate or flocculate, causing the pigment particles to settle out of the ink dispersion. Additionally, in the case of thermal ink jet systems, pigmented ink dispersions suffer from the tendency of materials to settle onto, and coat, the heating elements inside printer head nozzles. This causes a reduced thermal efficiency of the print head which results in the formation of smaller ink droplets, lower drop velocity, and lower image quality. This effect is commonly referred to as "kogation".

While these properties are often desirable or even necessary, their achievement can be difficult in pigmented inks. Pigment dispersions are inherently thermodynamically unstable. Suspended pigment particles can tend to agglomerate due to attractive interactions (e.g., van der Waals forces) between them.

Dispersants are typically employed in pigmented ink jet inks to stabilize the dispersion to prevent agglomeration or flocculation of the pigment particles and consequent settling of the pigment particles out of the dispersion. It is theorized that dispersing compounds behave by adsorbing onto a pigment surface to create a protective layer around each pigment particle to counteract attractive forces between the particles, thereby preventing agglomeration and flocculation.

Typically, four or more colors are used for ink jet printing. The different colored inks, and the components thereof, are preferably compatible with each other when in contact prior to drying. Yet, different colors and types of pigments tend to have different surface properties, and it can therefore be difficult to form inks of different colors, in stable dispersions, using the same dispersant. A set of multi-colored inks may require several different dispersants. A problem exists when the different dispersants are optimal for different colored pigments, leading to a high risk of incompatibility. For instance, different colored inks are considered incompatible if, upon mixing, a component of an ink (e.g., a dispersant) were to cause flocculation of pigment particles of another ink, causing portions of the colored image to be inaccurate or otherwise unacceptable.

A need exists for dispersants useful in ink jet inks that exhibit one or more of the above-described properties, including: the ability to disperse a pigment into a stable dispersion that will not suffer from agglomeration, flocculation, or kogation; preferably, the ability to be used with a number of different colored pigments comprising a broad spectrum of colors; that do not cause significant deposition of substances on heater elements during jetting; that provide an ink having fast drying properties; and, that provide an ink of proper character (e.g., viscosity, surface tension, etc.) for use in ink jet printing. A need simultaneously exists for ink jet printer inks that are free or substantially free of organic solvents.

SUMMARY OF INVENTION

The invention provides inks for use with ink jet printing applications, the inks comprising a polyurethane dispersant. The polyurethane dispersants are useful to disperse a variety of different colored pigments with improved resistance to agglomeration or flocculation of pigment particles, and kogation. The inks can be formulated to exhibit a broad range of desired properties such as surface tension and viscosity, to exhibit rapid drying of the printed image, and to provide an ink that is stable over useful periods of time.

An aspect of the present invention relates to a pigmented ink comprising a liquid medium and a pigment, the pigment being stabilized by a polyurethane dispersant, and the ink being suitable for use in an ink jet printer.

Another aspect of the invention relates to a method of stabilizing a pigmented ink suitable for use in an ink jet printer. The method includes the step of adding a polyurethane dispersant.

Yet another aspect of the invention relates to a pigmented ink comprising a liquid medium and a pigment, the pigment being stabilized by a polyurethane dispersant, the ink being suitable for use in an ink jet printer, and the ink being substantially free from organic solvent; i.e., being substantially aqueous.

Within the present description, the term "stabilized" or "stable," e.g., when used to refer to a stabilized dispersion containing a pigment dispersed in a liquid medium, refers to such a dispersion wherein pigment particles exhibit a reduced propensity to agglomerate or flocculate, e.g., as can be shown by a reduced increase in particle size, or a reduced propensity to settle out of the dispersion, over time.

DETAILED DESCRIPTION

The inks of the invention include a liquid medium having dispersed therein a pigment. The liquid medium can be a liquid medium within which (in combination with a polyurethane dispersant as described below) can be dispersed pigment particles. The liquid medium can be entirely water, can contain water in combination with one or more organic solvents, or can be entirely organic solvent.

Preferably, the liquid medium contains water; e.g., at least 20% by weight water, more preferably 75 to 100 wt % water.

An organic solvent might be included in the liquid medium, for instance, to control drying speed of the ink, to control surface tension of the ink, to allow dissolution of an ingredient (e.g., of a surfactant), or, as a minor component of any of the ingredients; e.g., an organic solvent may be present in a surfactant added as an ingredient to the ink.

The organic solvent can be any of a number of organic solvents known to be useful with pigmented inks or pigment dispersions. Representative examples of suitable organic solvents include: alcohols such as methyl alcohol, ethyl alcohol, n-propyl alcohol, isopropyl alcohol, n-butyl alcohol, sec-butyl alcohol, t-butyl alcohol, iso-butyl alcohol, etc.; ketones or ketoalcohols such as acetone, methyl ethyl ketone, diacetone alcohol, etc.; esters such as ethyl acetate and ethyl lactate; polyhydric alcohols such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, trimethylopropane ethoxylate; lower alkyl ethers such as ethylene glycol monomethyl or monoethyl ether, diethylene glycol methyl or ethyl ether, and triethylene glycol monomethyl or monoethyl ether; nitrogen-containing compounds such as 2-pyrrolidinone and N-methyl-2-pyrrolidinone; sulfur-containing compounds such as dimethyl sulfoxide, tetramethylene sulfone, and thioglycol.

The amount of organic solvent and/or water within the liquid medium can depend on a number of factors, such as the particularly desired properties of the ink dispersion such as the viscosity, surface tension, drying rate, etc., which can in turn depend on factors such as the type of ink jet printing technology intended to be used with the ink, such as piezo-type or thermal-type printheads, as well as the type of substrate the ink is intended to be printed on. For some applications, the liquid medium can comprise an aqueous solution including a mixture of water and solvent. Preferred solvents for such water-based media include polyhydric alcohols, most preferably alkylene glycols such as diethylene glycol. For such water-based media, preferred amounts of organic solvent can be in the range from 0 to about 80 parts by weight organic solvent based on 100 parts by weight of the liquid medium (defined as water plus organic solvent), with the range from about 2 to 25 parts by weight organic solvent per 100 parts liquid medium being preferred.

The pigment can be any pigment capable of being dispersed, in combination with a polyurethane dispersant, in the liquid medium. Many suitable pigments are known, of different colors, particle sizes, chemical compositions (e.g., organic or inorganic), surface characteristics, etc. The pigment particles should be of a size sufficiently small to allow free flow of the particles through an ink jet printing device, especially at the nozzle (typically having a diameter of from 10 to 80 microns). As for pigment particle size distribution, narrower size distributions are generally preferred.

Colors of pigments include, for example, black, cyan, yellow, and magenta. These colors are typical, but any other color pigment can be used as well. Generally, a single pigment color will be used in a single ink. Still, if desired, more than one color could be used in a single ink.

Examples of black pigments include carbon black, such as Special Black 4, Special Black 5, Special Black 6, Special Black 4A, Color Black FW 200, and Color Black FW2 pigments (all manufactured by Degussa Corporation of Ridgefield, N.J.); RAVEN 1200 carbon black, RAVEN 1170 carbon black, RAVEN 3500 carbon black, and RAVEN 5750 carbon black pigments (all available from Columbian Chemical Corp. of Atlanta, Ga.); MOGUL L carbon black and STERLING NS carbon black pigments (both available from Cabot Corp. of Boston, Mass.); and Carbon Black MA-100 pigment (available from Mitsubishi Kasei Corp. of Tokyo, Japan). The selection of a suitable black pigment can be based upon considerations of surface oxidation (high "volatiles" preferred), and the degree of blackness (also called jetness) of the pigment. Pigments having a high surface oxide content are more hydrophilic, and thereby much easier to disperse. Pigments with a high degree of blackness or jetness provide a high quality printed image.

Examples of yellow pigments include FANCHON Fast Y-5700 PY 139 and FANCHON Fast Yellow Y-5688 C.I. Pigment Yellow 150 pigments (available from Bayer Corp. of Rock Hill, S.C.); SUNBRITE Yellow 14 presscake and SPECTRA PAC Yellow 83 pigments (both available from Sun Chemical Corp. of Cincinnati, Ohio); SANDORIN Yellow 6GL (available from Clariant Corp. of Charlotte, N.C.); and IRGAZIN Yellow 2RLT PY 110, IRGAZIN Yellow 2GLTN PY 109, IRGAZIN Yellow 2GLTE PY 109, and IRGAZIN Yellow 3RLTN PY 110 pigments (all available from Ciba Geigy of Newport, Del.). A primary consideration for selecting yellow pigment is lightfastness, since it is very desirable to produce graphic images that are adapted to outdoor applications. Another consideration is the shade of the pigment. It can generally be preferred to have a green shade yellow pigment in this kind of applications. Of all the examples listed above, FANCHON Fast Yellow Y-5688 C.I. Pigment Yellow 150 and SANDORIN Yellow 6GL are most preferred because they meet the two considerations.

For magenta inks, lightfastness is also the primary consideration. Quinacridone magenta pigment is known to have excellent lightfastness, and therefore, is one preferred magenta pigment. Examples of magenta pigments include QUINDO Magenta RV-6828 Pigment Red 122, QUINDO Magenta RV-6831 Pigment Red 122 presscake, QUINDO Red R-6713 PV 19, and QUINDO Magenta RV-6843 Pigment Red 202 pigments (all available from Bayer Corp.); and SUNFAST Magenta 122 and SUNFAST Magenta 202 pigments (both available from Sun Chemical Corp.).

For cyan inks, the considerations above, (i.e., lightfastness, durability, etc.), apply as well. Because a variety of satisfactory properties may be found using copper phthalocyanine as a cyan pigment, inks comprising such pigments can be preferred. Examples of cyan pigments include PALOMAR Blue B4810 PB 15:3, PALOMAR Blue B-4710 PB 15:1, and PALOMAR Blue B-4900 pigments (all available from Bayer Corp.); and SUNFAST Blue 15:3 presscake and SUNFAST Blue 15:3 powder (available from Sun Chemical Corp.)

An important consideration in formulating a set of colored ink jet inks for printing color images is the compatibility of the inks with inks of other colors, and ingredients thereof. This can be important because during use, inks of more than one color may be mixed together, or, at the very least contacted with one another. When incompatible inks or ingredients contact one another they can coalesce and present a mottled, non-uniform printed image. As such, when more than one ink is used in a multi-color printing process, it is desirable, to the largest extent possible, to formulate the different inks with compatible, or preferably identical, ingredients. (Of course in each ink the pigment will differ). Unfortunately, however, because different pigments tend to have different surface properties, different colored pigments generally are not stabilized by a single dispersant. That notwithstanding, some of the individual dispersants described below have been found to be compatible with at least one pigment in each of the four primary printing colors.

The polyurethane dispersant comprises a polymer backbone having one or more urethane linkages. The term "polyurethane" as used throughout the description with respect to the invention contemplates urethane compounds containing only a single urethane linkage, as well as those containing multiple urethane linkages; i.e., the polyurethane dispersant has a backbone containing one or more urethane units:

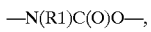

—N(R1)C(O)O—, where R1 comprises hydrogen, an alkyl, or an aryl. Each urethane unit connects two organic groups such as those shown below as R2 or R2'; the urethane linkages are represented here as X:

R2'—(X—R2)$_n$—XR2'  (1).

In the formula, each R2 or R2' can be the same or different, n can be zero or greater, and each urethane linkage X can be of the same or different orientation with respect to other urethane linkages; that is, the linear orientation of X can independently be either —OC(O)N(R1)— or —(R1)N(O)CO—, and can be the same or different within any single urethane compound.

R2 and R2' represent multivalent and monovalent organic groups, respectively. R2 can be a multivalent, e.g., divalent, trivalent, etc., organic linking group, and R2' can be a monovalent terminal organic group. Although not shown by Formula 1, additional R2' terminal groups will be necessary for branched polymers, where one or more R2 has a valency of three or more.

Each R2 can be the same or different within a single polyurethane dispersant, and can independently comprise a multivalent organic group such as a substituted or unsubstituted, straight or branched, saturated or unsaturated aryl or aliphatic group, e.g., alkylene, cycloalkylene, substituted alkylene, substituted cycloalkylene, polymerized vinyl monomer segment, etc.; each R2 independently and optionally can be substituted with halogen (e.g., fluorine) and can optionally contain one or more heteroatom-containing chemical moiety, the heteroatom being situated, e.g., as a divalent oxygen, carbonyl oxygen, trivalent nitrogen, or divalent sulfur, and the chemical moiety being, e.g., an ether or polyether, an ester or polyester, a carbonate or polycarbonate, one or more urethane units, etc.

The polyurethane dispersant can comprise two or more terminal R2' groups (more if the polyurethane backbone is branched, e.g., by one or more trivalent R2 groups), with each R2' being the same or different. Each R2' can be a monovalent organic group analogous to any one of the multivalent organic groups identified within the definition of R2, with the difference being that R2' is monovalent. Specifically, each R2' can independently comprise a monovalent organic group such as a substituted or unsubstituted, straight or branched, saturated or unsaturated aryl or aliphatic group, e.g., alky, cycloalkyl, substituted alkyl, substituted cycloalkyl, polymerized vinyl monomer segment, etc.; each R2' can independently be optionally substituted with halogen (e.g., fluorine), and can optionally contain one or more heteroatom-containing chemical moiety, the heteroatom being situated, e.g., as a divalent oxygen, carbonyl oxygen, trivalent nitrogen, or divalent sulfur, and the chemical moiety being, e.g., a polyether, a polyester, a polycarbonate, etc.

The polyurethane dispersant comprises one or more ionic or non-ionic dispersing or stabilizing group; e.g., dispersing or stabilizing chemical groups within or pendant from the polyurethane, for example as a portion of or pendant from one or more of R2 or R2'. While wishing not to be bound by any particular theory, it is believed that a dispersing group can be effective by one of at least two chemical mechanisms. A nonionic (e.g., hydrophilic) dispersing group is thought to stabilize a pigment particle within a dispersion by orienting the nonionic group into the liquid medium to provide entropic or steric stabilization. Ionic dispersing groups are believed to stabilize a pigment within a dispersion by providing a charged layer around a pigment particle that overcomes attractive forces between the particles. Ionic dispersing groups can typically be used in combination with a nonionic dispersing group to achieve a combined dispersing and/or stabilizing affect.

Examples of non-ionic dispersing groups include, for example, a non-ionic dispersing segment present within R2 or R2' which is solvent-soluble and that promotes dispersion of the polyurethane within a chosen solvent. When the chosen solvent comprises water, for example, a preferred non-ionic dispersing segment can be a hydrophilic dispersing segment such as an alkylene oxide or polyoxyalkylene oxide segment, e.g., —((CH$_2$)$_n$—O)$_m$—, wherein n can preferably be from 2 to 4, and m can be from about 1 to 400, preferably from about 5 to 200.

R2 or R2' can further optionally contain one or more dispersing or stabilizing groups pendant from the backbone of the organic polymer, for example, one or more dispersing groups of a nature that will increase the stability of a dispersed pigment.

Examples of ionic dispersing groups include carboxylate groups (—COOM), phosphate groups (—OPO$_3$M$_2$), phosphonate groups (—PO$_3$M$_2$), sulfonate groups (—SO$_3$M), quaternary ammonium groups (—NR$_3$Y, wherein Y is a monovalent anion such as chlorine or hydroxyl), or any other effective ionic group. M is a cation such as a monovalent metal ion (e.g., Na$^+$, K$^+$, Li$^+$, etc.), H$^+$, NR$_4^+$, and each R can be independently an alkyl, aralkyl, aryl, or hydrogen. These ionic dispersing groups are typically located pendant from the polyurethane backbone.

The dispersant may further comprise a fluorinated group. A fluorinated group may be included on the polyurethane dispersant to improve dispersion stability and to provide improved performance in ink jet printing. Fluorinated groups are typically present on the polyurethane dispersant as a pendant fluorinated group; e.g., pendant from one or more R2 or R2' groups. Useful fluorinated groups include fluorinated aliphatic groups such as branched or unbranched, saturated or unsaturated, substituted or unsubstituted fluoroalkyl, fluorocycloalkyl, fluoroaryl, groups, etc. A fluorinated group can contain one or more heteroatoms such as a divalent oxygen, carbonyl oxygen, trivalent nitrogen, or divalent sulfur, etc.

The fluorinated group may be partially or substantially fluorinated (e.g., perfluorinated). The fluorinated group may contain segments that are either fully fluorinated or fully hydrocarbon. Specific examples of pendant fluorinated groups include fluoroalkyl groups connected to the polyurethane backbone by a non-fluorinated linking group:

wherein —R3— comprises a non-fluorinated linking group and $R_f$ comprises a fluorinated chemical moiety. R3 can, for example, comprise an alkyl group such as —CH$_2$CH$_2$— or an alkyl sulfonamide group such as —CH$_2$CH$_2$(C$_2$H$_5$)NSO$_2$—. $R_f$ can comprise, for example, a fluorocarbon such as $C_pF_{2p+1}$, wherein p is in the range from about 1 to 18, e.g., $C_2F_5$, $C_3F_7$, $C_4F_9$, etc.

In general, the polymeric dispersant can be of any molecular weight that will prove useful in dispersing pigment particles to provide a stabilized dispersion. If the polyurethane dispersant is too low in molecular weight, it may not contribute toward dispersing and stabilizing the pigment particles. On the other hand, too high a molecular weight can tend to give an ink that contains the dispersant a relatively higher viscosity, which can negatively affect the ability to apply the ink using an ink jet printhead. Preferred molecular weights of the polyurethane dispersant are typically in the range from between 1,000 to 100,000 (number average molecular weight), with the range from about 2,000 to 10,000 being particularly preferred.

Dispersing groups can be present on the polyurethane dispersant in any amount effective to allow the dispersant to properly be effective within an ink jet ink dispersion; i.e., in an amount sufficient to allow dispersion of the pigment and stabilization of the ink dispersion. The appropriate amount of dispersing group can depend on factors such as the pigment desired to be dispersed, and the identity of the liquid medium, for example whether the liquid medium comprises mainly a polar solvent such as water, or a non-polar organic solvent. As an example, in aqueous systems pendant carboxylate dispersing groups can preferably be present on the polyurethane dispersant to provide an equivalent weight (total grams polyurethane dispersant per mole dispersing group) in the range from about 150 to about 5,000, more preferably from about 200 to 2,500, most preferably from about 200 to 1,500.

The amount of pendant fluorinated groups present on any particular polyurethane dispersant can be any useful amount, and can be measured in terms of the weight percent of fluorine with respect to total weight of the polyurethane dispersant. Typical values of the weight percent of fluorine in the polyurethane dispersant can be up to about 20 wt %, preferably from about 1 to 10 wt % fluorine in the polyurethane dispersant.

The polyurethane dispersant can be prepared by a variety of methods including those known in the chemical and polymer arts to be useful toward synthesizing such polyurethanes. Typically a polyurethane can be prepared by polymerization of one or more isocyanate compound with one or more alcohol compound. Although both monofunctional and polyfunctional isocyanate and alcohol compounds can be used, preferably at least some polyfunctional monomer is present.

The composition of the isocyanate and alcohol compounds can be any chemical composition that allows the preparation of a polyurethane as described above, and in accordance with the definitions of R2 and R2', and the described stabilizing, dispersing, and fluorinated components. Optionally the isocyanate and alcohol compounds can be reacted with one or more other isocyanate reactive-compound such as a mono- or polyfunctional amine or mercaptan, as is known in the polyurethane art. Any one or combination of the isocyanate, alcohol, or other isocyanate-reactive compounds can include one or more stabilizing segment or dispersing or fluorinated groups.

The isocyanate compound can be any of a wide variety of isocyanate compounds known to be useful for the production of polyurethanes such as those described above. The isocyanate compound can be, with respect to the isocyanate group, either monofunctional or polyfunctional. In the general isocyanate formula below, n can be one, two, or more:

"Polyisocyanate" refers to organic compounds having two or more isocyanate groups on a single molecule; i.e., wherein n is two or more. This definition includes diisocyanates, triisocyanates, tetraisocyanates, etc., and mixtures thereof. Preferably, at least one diisocyanate is used, either alone or in combination with one or more other polyisocyanate. Also preferably, the isocyanate compound can be of a relatively low molecular weight, e.g., less than about 500 Mn (those typically referred to as monomers).

The non-isocyanate portion Z of the isocyanate compound can be of any chemical nature that provides utility in the preparation of the above-described polyurethanes. Z generally corresponds to the definitions of R2 and R2'. Z can be a mono-, di-, or trivalent, etc., chemical moiety such as a substituted or unsubstituted, straight or branched, saturated or unsaturated aryl or aliphatic group, e.g., alkyl, alkylene, cycloalkyl, cycloalkylene, substituted alkyl or alkylene, substituted cycloalkyl or cycloalkylene, polymerized vinyl monomer segment, etc. Z can optionally be substituted with halogen (e.g., fluorine), and can optionally contain one or more heteroatom-containing chemical moiety, the heteroatom being situated, e.g., as a divalent oxygen, carbonyl oxygen, trivalent nitrogen, or divalent sulfur, and the chemical moiety being, e.g., a polyether, a polyester, a polycarbonate, etc. Z can include one or more non-ionic or ionic dispersing group or a fluorinated group, as described above.

Examples of useful mono-isocyanates include alkyl isocyanates such as octadecyl isocyanate, and aryl isocyanates such as phenyl isocyanate.

Examples of useful polyisocyanates include diisocyanates such as diphenylmethane diisocyanate, isophorone diisocyanate, toluene diisocyanate, hexamethylene diisocyanate, tetramethylxylene diisocyanate, p-phenylene diisocyanate, hydrogenated diphenylmethane diisocyanate, and mixtures thereof.

Examples of isocyanate compounds that contain a pendant dispersing group include sulfonated toluene diisocyanate and sulfonated diphenylmethanediisocyanate.

The alcohol compound can generally comprise one or more of a number of various alcohols (monohydric or polyhydric) generally known to be useful in the production of polyurethanes such as the polyurethanes described above. Generically, the alcohol can be shown as:

In the formula, m is at least one (where m is two or more, the compound can be referred to as a polyol). Z2 can be of any chemical nature that provides utility in the preparation of the described polyurethanes, with Z2 generally corresponding to the definitions of R2 and R2'. Z2 can be a mono-, di-, or trivalent, etc., chemical moiety such as a substituted or unsubstituted, straight or branched, saturated or unsaturated aryl or aliphatic group, e.g., alkyl, alkylene, cycloalkyl, cycloalkylene, substituted alkyl or alkylene, substituted cycloalkyl or cycloalkylene, polymerized vinyl monomer segment, etc. Z2 can optionally be substituted with halogen (e.g., fluorine), and can optionally contain one or more heteroatom-containing chemical moiety, the heteroatom being situated, e.g., as a divalent oxygen, carbonyl oxygen, trivalent nitrogen, or divalent sulfur, and the chemical moiety being, e.g., a polyether, a polyester, a polycarbonate, etc. Z2 can include one or more non-ionic or ionic dispersing groups, or a fluorinated group, as described above.

Although a polymerized vinyl monomer segment can be present in either the isocyanate compound or the alcohol compound, in practice, polymerized vinyl monomer segments are generally more common in alcohol compounds. Polymerized vinyl monomer segments can be derived from monomers including styrene, halogenated styrenes, alkylated styrenes, methoxystyrenes, acrylic acid, methacrylic acid, acrylonitrile, acrylamide, methacrylamide, methylmethacrylate, methyl acrylate, ethyl acrylate, isopropyl acrylate, n-butyl acrylate, 2-ethylhexyl acrylate, isobornyl acrylate, glycidyl acrylate, vinyl chloride, vinylidene chloride, vinyl acetate, vinylidene fluoride, N-ethylperfluorooctanesulfonamidoethyl acrylate, N-ethylperfluorooctanesulfonamidoethyl methacrylate, N-butylperfluorooctanesulfonamidoethyl acrylate, N-butylperfluorooctanesulfonamidoethyl methacrylate, N-methylperfluorooctanesulfonamidoethyl acrylate, N-methylperfluorooctanesulfonamidoethyl methacrylate, other acrylic acid esters and amides, other methacrylic acid esters and amides, and mixtures thereof.

A preferred class of polyols includes diols, including low molecular weight diols, oligomeric diols, and mixtures thereof. Low molecular weight polyols (polyols having a number average molecular weight of no more than about 500) may be used to provide preferred hardness or branching characteristics to the polymer. Representative examples include ethylene glycol; propylene glycol; 1,3-propanediol; 1,4-butanediol; 1,5-pentanediol; 1,6-hexanediol; 1,2-hexadecanediol, 1,2-dodecanediol, glycerol monoesters or diesters of fatty acids (such as glycerol monooleate, glycerol monostearate and the like), neopentyl glycol; diethylene glycol; dipropylene glycol; 2,2,4-trimethyl-1,3-pentanediol; 1,4-cyclohexanedimethanol; ethylene oxide and/or propylene oxide adducts of bisphenol A; and ethylene oxide and/or propylene oxide adduct of hydrogenated bisphenol A, trimethylolpropane, trimethylolethane, and mixtures thereof.

Oligomeric polyols may be used to provide toughness and hydrophobic or hydrophilic characteristics to a polyurethane dispersant. Oligomeric polyols are defined as polyols having a number average molecular weight between about 500 and 5000. Preferred members of this class are polyester diols, polyether diols and polycarbonate diols.

Hydrophobic oligomeric diols may be used to provide toughness and improved interaction with hydrophobic pigment surfaces. Preferred hydrophobic oligomeric diols include polypropylene oxides, polytetramethylene oxides, polyester diols such as polycaprolactone diols and aliphatic polycarbonate diols such as Ravecarb™ 106 from Enichem America, Inc., of Houston Tex.

Hydrophilic oligomeric polyols may provide hydrophilicity and additional dispersion stabilization. Preferred oligomeric hydrophilic polyols include polyethylene oxide alcohols and diols which provide solvent-soluble (e.g., water-soluble) segments capable of providing dispersed particles with a protective layer against flocculation (steric stabilization). It is advantageous in some cases to incorporate polyethylene oxide monoether segments of from about 500 to about 5000 molecular weight onto the ends of some or all of the chains of a polyurethane dispersant. This can provide a non-ionic stabilization mechanism that augments ionic stabilization obtained with ionic dispersing groups such as a carboxylate group.

Some preferred alcohol compounds include alcohols or polyols comprising one or more ionic dispersing group, such as those defined above (carboxylate, phosphate, phosphonate, etc.). One class of specifically preferred polyols includes carboxylic acid polyols such as those falling within the general formula:

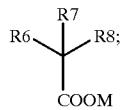

wherein at least one and preferably two of R6, R7, and R8 is independently a hydroxy-functional organic group, e.g., $-C_nH_{2n}OH$, wherein each n is independently in the range from 1 to about 6. The remainder of R6, R7, and R8 can be hydrogen or an alkyl, aryl, or aralkyl group having from about 1 to 16 carbon atoms. M is a monovalent metal ion, ammonium salt $NR_4^+$ (where R is alkyl, aryl, aralkyl, or hydrogen or combinations thereof), or $H^+$.

One example of a particularly preferred carboxylic acid diol is dimethylolpropionic acid (DMPA):

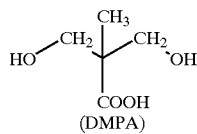

(DMPA)

Another preferred class of alcohol compound can contain a pendant sulfonate dispersing group. Examples of such compounds include the class of the general formula:

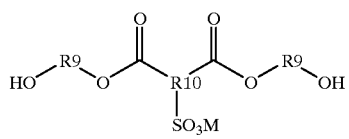

wherein R9 comprises an organic group selected from linear and branched aliphatic groups, e.g., alkylene, oxyalkylene, polyoxyalkylene, etc., with R9 preferably having from about 2 to 500 carbon atoms; most preferably from about 10 to 100 carbons. R10 comprises an alkyl, aryl, or aralkyl group, and M is a cation as identified above. An example of a class of particularly preferred sulfonate-containing alcohol compounds are sulfo isophthalate diesters of the general formula:

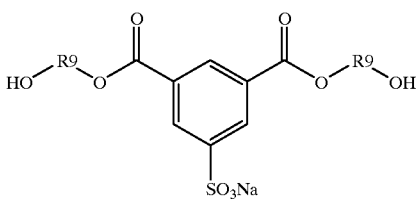

A second example of particularly preferred sulfonate-containing alcohol compounds are those of the general formula:

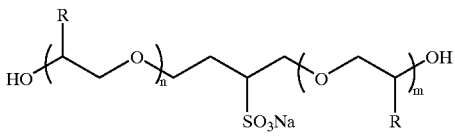

where m and n are each independently preferably in the range from about 1 to 50. These alcohol compounds are described, for example, in U.S. Pat. No. 4,652,466, the description of which is incorporated herein by reference.

Useful alcohol compounds that contain quaternary ammonium groups include those of the general formula:

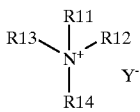

wherein one or more of R11, R12, R13, and R14 each independently comprise hydroxy-functional organic groups such as hydroxyethyl, and the remaining groups each independently comprise alkyl, aryl, or aralkyl groups. In the formula, Y is a monovalent anion such as a Cl$^-$, Br$^-$, I$^-$, OH$^-$, actetate, etc. A particularly preferred such alcohol compound is the polyol bis(hydroxyethyl)dimethyl ammonium chloride.

Another class of preferred alcohol compound includes fluoroaliphatic alcohols; e.g., alcohols having one or more alcohol (hydroxy) group and a fluorinated group such as a fluoroaliphatic moiety. Particularly preferred fluoroaliphatic alcohols include those comprising a sulfonamide portion, e.g., having the structure:

where n ranges from 1 to about 18; one or both of R4 and R5 comprise a hydroxy-functional organic group such as —(CH$_2$)$_p$—OH where p can be from about 1 to 5; and a non-hydroxy-functional organic group R4 or R5 can be, for example, an alkyl, an aryl, an aralkyl, etc.; and

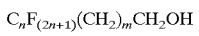

where n and m independently range from 1 to about 18. Examples of particularly preferred fluoroaliphatic alcohols include C$_8$F$_{17}$SO$_2$N(C$_2$H$_4$OH)(CH$_2$CH$_3$), C$_8$F$_{17}$SO$_2$N(C$_2$H$_4$OH)$_2$, C$_6$F$_{13}$CH$_2$CH$_2$OH, C$_8$F$_{17}$CH$_2$CH$_2$OH, and C$_{10}$F$_{21}$CH$_2$CH$_2$OH.

Useful monofunctional alcohols in addition to the described fluorochemical alcohols include hydrocarbon alcohols and polyethylene oxide monoethers. Preferred monoalcohols include oleyl alcohol, stearyl alcohol, and polyethylene oxide monoethers of 750 to 2000 molecular weight, e.g., as are available from Union Carbide Corporation under the trade name "Carbowax."

Within the present invention, other isocyanate-reactive compounds may additionally be incorporated into the polyurethane dispersant even though they are not alcohols. Examples include monoamines, diamines, polyamines (to form urea linkages), and thiols (e.g., to form thiocarbamate linkages). A preferred compound of this type is ethylene diamine.

In preparing the polyurethane dispersants, the polyisocyanate compound, the alcohol compound, and/or any optional polyisocyanate-reactive compounds can be combined and reacted preferably in such a ratio that the alcohols and isocyanate-reactive compounds outnumber the isocyanate groups on a molar basis. Further, and although amounts outside of this range can also be useful, it can be preferred that pendant dispersing and fluorinated groups comprise up to about 50 percent by weight of the polyurethane dispersant.

The isocyanate compound can be reacted with the alcohol and/or other optional isocyanate-reactive compounds by methods and under conditions known to be useful in the polyurethane art. Preferably, the reaction conditions are suitable to form a polymer, while not being sufficiently harsh so as to cause damage to or reaction of other components of the reactants; e.g., the reaction conditions should not cause groups such as pendant carboxyl groups of a carboxylic acid alcohol to react with an isocyanate; this specific side reaction can be prevented by limiting the temperature of the reaction to below about 100° C.

Exemplary methods of preparation involve the polymerization of reactants in an organic solvent. In a typical procedure, an alcohol (e.g., a diol), an isocyanate (e.g., a polyisocyanate such as a diisocyanate), and any other optional isocyanate-reactive compounds can be dissolved in a dry solvent such as 2-butanone, preferably in relative amounts such that the moles of alcohol and isocyanate-reactive groups are greater than the moles of isocyanate groups. A catalyst such as dibutyltin dilaurate can be added and the mixture heated to about 75° C. until the isocyanate groups have reacted to produce a solution containing a polyurethane dispersant.

Following polymerization, it can be preferred to partially or fully neutralize any acidic or basic groups pendant from the polyurethane. Acidic pendant groups may be neutralized using any of a variety of organic or inorganic bases including tertiary amines, quaternary amines, alkali metal salts, or other monovalent salts. Preferred bases include triethanolamine, dimethylethanolamine, methyldiethanolamine, triethylamine, ammonia, sodium hydroxide, potassium hydroxide, lithium hydroxide, tetramethylammonium hydroxide, and tetrabutylammonium hydroxide. Particularly preferred bases include volatile amines such as ammonia, triethylamine, and dimethylethanolamine. The solution containing the polyurethane dispersant can be added to water containing a base capable of neutralizing most or all of the basic or acidic groups. The resulting aqueous dispersion can then be heated to distill off any organic solvent. Basic pendant groups can be neutralized using any of a variety of organic or inorganic acids, as is known in the chemical art.

Another method of preparing polyurethane dispersants is to prepare a polyurethane prepolymer optionally having desired dispersing and/or fluorinated groups, and having an excess of isocyanate groups. Solvent may optionally be used. The isocyanate-terminated polyurethane prepolymer may then be added to water containing a diamine, or to water to which a diamine is later added, wherein the water is at a pH such that the polyurethane is dispersible. The diamine can react with the open isocyanates and the dispersing groups cause dispersion of the polymer in the water to produce a polyurethane dispersion with no remaining isocyanate. Any solvent can be removed by distillation.

While wishing not to be limited to a particular theory, the use of a polyurethane dispersant in an ink jet ink is believed to minimize particle flocculation, even at the high temperatures involved in thermal ink jet printing processes. This is thought to occur, for example, with respect to ionic dispersing groups, due to a molecular arrangement which provides electrostatic repulsive forces between the stabilized particles. It is believed that these electrostatic repulsive forces are generated on the particle surface by the pendant dispersing groups of the polyurethane molecules which are adsorbed to the pigment. As discussed above, reduction of particle flocculation is desired because of the high thermal energy generated during jetting, which causes frequent and energetic particle interactions. Reduction of particle flocculation is further desired because it results in inks having increased dispersion stability and shelf-life.

Inks of the present invention can optionally include any of a number of various additives and ingredients that are known to be useful in preparing pigmented dispersions, and in particular, ink jet inks. For example, ionic and nonionic surfactants can be included to improve wetting and to control the surface tension of the ink system. Non-limiting examples of ionic surfactants include AEROSOL OT surfactant (available from American Cyanamid of West Paterson, N.J.); and DARVAN No. 1, DARVAN No. 7 surfactants (both available from T. T. Vanderbilt Co. of Norwalk, Conn.), and Fluorad® FC-120 surfactant (available from 3M Company of St. Paul Minn.). Non-limiting examples of nonionic surfactants include TRITON X-100, TRITON X-102, TRITON X-114, TRITON X-101, and TRITON CF-10 surfactants (all available from Union Carbide Corp.); SURFYNOL CT-136 (which is actually a mixture of anionic and nonionic surfactants), SURFYNOL 104, SURFYNOL 465, and SURFYNOL TG surfactants (all available from Air Products and Chemicals of Allentown, Pa.); and Tergitol® NP-9 and Tergitol® NP-10 surfactants (both available from Union Carbide Chemicals and Plastics Co. of Danbury, Conn.).

Surfactants can be present in the ink in understood amounts, with preferred amounts being in the range from about 0.01 to about 6 weight percent of the liquid medium and preferably from about 0.05 to about 4 weight percent.

The ability of ink jet inks to print from an ink jet cartridge after the cartridge has been uncapped and exposed to air is call "decap time." In order to promote long decap times, one or more humectants may be included in the ink. Examples of useful humectants include polyethylene glycols, ethoxylated alcohols, and others.

Formula (2) represents sulfonated polyethylene oxides particularly useful as humectants in the present invention. These are described in Applicants' copending U.S. patent application Ser. No. 08/757,897, filed Nov. 27, 1996. Such humectants have been found to extend decap time and help control the drying rate of inks. Preferred humectants can have the following structure, where "a" ranges from about 8 to 25.

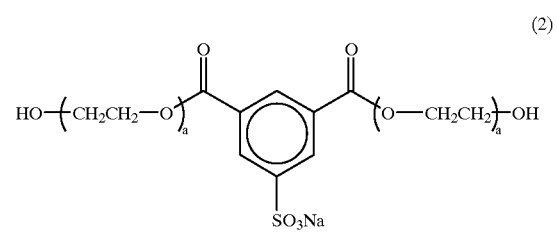

(2)

Other useful additives which will also help to control drying rate include trimethylol propane, urea and its derivatives, amides, hydroxyether derivatives such as butyl carbitol or Cellosolve®, amino alcohols, and other water soluble or water miscible materials, as well as mixtures thereof.

Other ink additives commonly known in the art include biocides, fungicides, defoamers, corrosion inhibitors, viscosity modifiers, pH buffers, penetrants, sequestering agents, and the like.

In general, the amounts of ingredients such as pigment, solvent, water, and additives included in ink jets are known and understood in the ink jet ink dispersion art. The amounts of each ingredients present in a particular ink of the invention can depend on a number of factors, including, for example the identity of the ingredients (pigment, solvent, dispersant), the intended application of the ink jet ink (e.g., the intended receptor), among other factors. Although amounts of ingredients outside the following ranges can also be useful, examples of useful amounts can be as follows: pigment can be included in the ink, e.g., in an amount in the range from about 0.5 to 10% by weight of the ink jet ink dispersion. The amount of polyurethane dispersant can be any effective amount, i.e., an amount effective to disperse the pigment and stabilize the dispersion. Generally, the polyurethane dispersant can be present in the ink in an amount that depends on the amount of pigment, with the amount of polyurethane dispersant being, for example, an amount in the range from about 1 to 300 weight percent (wt %) of the pigment, with an amount in the range from about 1 wt % to 200 wt % being preferred.

The inks of the invention can be prepared from the above ingredients using compounding processes generally known to be useful with processing pigment dispersions. Some methods make use of ultrasonic energy to achieve mixing and particle deflocculation, while other methods use media mills such as ball mills, sand mills, or attritors. Media mills achieve acceptable pigment dispersion by subjecting a pigment mixture to high intensity microshearing and cascading which breaks down agglomerations of the pigment particles. Homogenizers and emulsifiers can also be used for ink compounding. The conventional two-roll mill and three-roll mill processing technologies can be effective techniques for dispersing pigment particles if the materials can be formulated into highly viscous paste for processing, then followed by a let-down step to produce the final ink.

In still another processing method, a pigment dispersion can be forced through a series of small nozzles having diameters on the order of about 150 micrometers to about 1000 micrometers. Such systems must be able to withstand very high pressures at high fluid velocities. Three different configurations for such systems may be used: a) a "wedge" configuration with orifices of decreasing diameter, b) a "wedge" configuration within which the orifices have cavitation enhancement devices, and c) an "impinging jet" configuration in which the dispersion stream is split into at least two elements, each stream is passed through an orifice to create a jet, and the jet streams are recombined by impinging them against each other. Each of these systems has been found to yield satisfactory results when processing water-based pigmented inks. Examples of these processes can be found in U.S. Pat. No. 5,482,077 (Serafin et al.), U.S. patent applications Ser. Nos. 08/555,671 and 08/693,552 (both Serafin et al.), and PCT Patent Publications WO96/14925 and WO96/14941 (both Serafin et al.), all incorporated by reference herein.

After an ink has been processed it can be filtered using any appropriate filter, for example a 5 micrometer Whatman Polycap 36 HD cartridge type filter (available from Arbor Technology, Ann Arbor, Mich.). A pump, such as a Masterflex peristaltic pump (available from Barnant Co., Barrington, Ill.) can be used to feed the ink through the filter. A flow rate of about 120 milliliters per minute with a back pressure of about 3 psi (0.21 kg/cm$^2$ metric) is preferred.

The inks of the invention are useful within ink jet printing applications. As such, the inks preferably flow freely through an ink jet printer cartridge, including the nozzle. The inks also preferably exhibit a reduced propensity of pigment agglomeration, reduced settling out of the pigment from the ink dispersion, and reduced clogging of ink jet printhead nozzles (as opposed to inks not suitable for use in ink jet applications). Although values outside of the following ranges can be useful, the inkjet inks can generally have a viscosity in the range from 1 to about 20 centipoise, preferably from about 1 to 10 centipoise, and a surface tension in the range from about 20 to 70 dynes per centimeter, preferably from about 25 to 60 dynes per centimeter.

Specific non-limiting embodiments of the invention appear in the following examples.

EXAMPLES

I. Material Preparation

Preparation 1

Urethane Polymer Containing Carboxyl Groups

To a 5 liter flask was added dimethylolpropionic acid (7.537 equivalents, 505.0 g), 2-butanone (2100 g), diphenylmethane diisocyanate (MDI, 7.160 equivalents, 895.0 g) and dibutyltin dilaurate (0.25 g). The mixture was heated with stirring at 80° C. for 4 hours until no isocyanate was present by infrared (IR) spectroscopy.

50 g of this solution was charged to a 500 ml flask, followed by triethanolamine (8 g, 0.055 equivalents), and water (72 g). The solvent was distilled to afford 93 g of a waterborne urethane at 28.1% solids.

Preparation 2

Urethane Polymer Containing Carboxyl Groups

To a 500 ml flask was charged glycerol monooleate (0.065 equivalents, 23.2 g, available from Pfaltz & Bauer, Inc. Waterbury, Conn.), oleyl alcohol (0.026 equivalents, 6.9 g), and 2-butanone (175 g). Some (100 g) of the 2-butanone was distilled to dry the reaction mixture. Isophorone diisocyanate (IPDI, 0.310 equivalents, 34.5 g) and dibutyltin dilaurate (0.2 g), were added to the reaction, which was then heated to 80° C. and held for 4 hours. The reaction was judged complete by IR spectroscopy, which showed no remaining hydroxyl adsorbance. Dimethylolpropionic acid (0.155 equivalents, 10.4 g) was added and the reaction was heated at 80° C. until no isocyanate was present by IR.

To 75 g of this solution was added triethanolamine (5.5 g) followed by 165 g of water and 2 drops of Tergitol® 15-S-5, available from Union Carbide Corp., Danbury, Conn. The 2-butanone was distilled off leaving a waterborne urethane dispersion determined to be 19% solids.

Preparation 3

Urethane Polymer Containing Carboxyl and Fluorochemical Groups

A 1 liter three neck round bottom flask was charged with neopentyl glycol (0.249 equivalents, 13.0 g), N,N-bis(2-hydroxyethyl) perfluorooctanesulfonamide (0.088 equivalents, 25.7 g, described in U.S. Pat. No. 4,540,765, compound B), dimethylolpropionic acid (0.565 equivalents, 37.9 g), 2-butanone (341 g), diphenylmethane diisocyanate (0.857 equivalents, 107.2 g) and dibutyltin dilaurate (0.2 g). The reaction was heated for approximately 6 hours at 75° C. whereupon no residual isocyanate was observed by IR spectroscopy. The product urethane solution was 38.4% solids.

To a 250 ml flask was added a portion of this urethane solution (50 g, 0.027 equivalents), 5% aqueous KOH solution (38.0 g, 0.034 equivalents), and water (62 g). The 2-butanone solvent was distilled to afford 122.5 g of product at 15.1% solids.

Preparation 4

Urethane Polymer Containing Carboxyl and Fluorochemical Groups

A 3 liter flask was charged with FC-10 FLUORAD™ Brand Fluorochemical Alcohol (0.204 equivalents, 112.0 g, available from 3M Company, St. Paul), neopentyl glycol (0.877 equivalents, 45.6 g), trimethylolpropane (0.224 equivalents, 10.1 g), and 2-butanone (1928 g). The polyols were dried by distilling 772 g 2-butanone. Diphenylmethane diisocyanate (0.3.681 equivalents, 460.1 g), dibutyltin dilaurate (0.02% by weight), and 2-butanone (66.24 g) were added to the reaction, which was then heated at 80° C. The prepolymer reaction was judged complete by IR spectroscopy after 1¼ hours. Dimethylolpropionic acid (2.570 equivalents, 172.2 g) was added and heating continued until no isocyanate was present by IR spectroscopy. The product urethane solution was determined to be 46.6% solids To a 5 liter flask was added a portion of the urethane solution (408.2 g, 0.305 equivalents), 5% aqueous KOH solution (308.8 g, 0.274 equivalents), and water (452 g). The 2-butanone solvent was distilled from the reaction mixture by heating to afford 952.4 g of waterborne urethane product at 18.4% solids.

Preparation 5

Urethane Polymer Containing Carboxyl Groups

A 500 ml three neck round bottom flask was charged with dimethylolpropionic acid (0.668 equivalents, 44.8 g), 2-butanone (150 g), toluene 2,4-diisocyanate (TDI, 0.635 equivalents, 55.2 g), and dibutyltin dilaurate (0.2 g). The reaction was heated at just below reflux until no isocyanate was present by IR spectroscopy, which required approximately 18 hours. The product urethane solution was 40% solids.

To 100 g of this urethane solution was added triethanolamine (20 g, 0.134 equivalents) and 250 g water. The 2-butanone solvent was distilled from the mixture leaving a waterborne urethane at 28% solids.

Preparation 6

Urethane Polymer Containing Carboxyl and Fluorochemical Groups

To a 500 ml flask was charged FC-10 FLUORAD™ Brand Fluorochemical Alcohol (0.034 equivalents, 19.5 g), trimethylolpropane (0.024 equivalents, 1.08 g), 2-butanone (209 g), toluene 2,4-diisocyanate (0.796 equivalents, 69.27 g), and dibutyltin dilaurate (0.2 g). After heating at 80° C. for 1 hour, the reaction was judged complete by IR. Dimethylolpropionic acid (0.738 equivalents, 49.45 g) was added and the reaction was stirred for 18 hours at 74° C. whereupon no isocyanate was detected by IR.

A portion of this product (92.1 g) was charged to a 1 liter flask, followed by triethanolamine (17.4 g, 0.117 equivalents), and water (142.6 g). The 2-butanone solvent was distilled to afford 232.22 g of waterborne product at 23.7% solids.

Preparation 7

Methyl Methacrylate/Methacrylic Acid Macromonomer Diol

To a 1 liter flask was charged methyl methacrylate (80 g), methacrylic acid (120 g), mercaptopropanediol (5 g), VAZO-64 (0.4 g, available from DuPont, Wilmington, Del.), and tetrahydrofuran (300 g). After purging with nitrogen, the reaction was heated to 55° C. for 1.5 hours. Cooled to 30° C. and added more VAZO-64 (0.4 g), purged with nitrogen and heated at 55° C. for 24 hours.

Preparation 8

Urethane Polymer Containing Carboxylate, Macromonomer and Fluorochemical Groups To a 500 ml flask was charged FC-10 FLUORAD™ Brand Fluorochemical Alcohol (0.0245 equivalents, 14.0 g), dimethylolpropionic acid (0.301 equivalents, 20.2 g), tetrahydrofuran (243 g), toluene 2,4-diisocyanate (0.337 equivalents, 29.3 g) and dibutyltin dilaurate (0.2 g). The reaction was heated at 65° C. for ½ hour. Macromonomer diol from Preparation 7 (25 g, 0.0166 equivalents) and tetrahydrofuran (110 g) were added and the reaction was held at 65° C. for 6 hours.

125 g of this solution were added to a solution of 6.5 g sodium hydroxide in 200 g water with stirring. The solvent was distilled off leaving a product urethane dispersion at 15% solids.

Preparation 9

Urethane Polymer Containing Phosphate Groups

A 250 ml flask was charged with a 75% solids toluene solution of monophosphorylated polypropylene oxide triol of 1100 molecular weight (described in U.S. Pat. No. 4,889,895) (0.038 equivalents of hydroxyl, 15.77 g solids, 20.5 g solution) and 2-butanone (87.4 g). The mixture was dried by distilling 34.5 g 2-butanone then cooled. Diphenylmethane diisocyanate (0.034 equivalents, 4.23 g) and dibutyltin dilaurate (0.2 g) were added and the reaction was heated at 79° C. for 3 hours. The reaction was judged complete when no isocyanate was present by IR spectroscopy. The product urethane solution was determined to be 23.0% solids.

A portion of the urethane solution (35 g) was added to a 500 ml flask, followed by sodium hydroxide solution (0.48 g, 0.0125 equivalents), and water (31 g). The 2-butanone solvent was distilled using a Büchi ROTAVAPOR® model RE-111 (available from Büchi Laboratoriums-Technik AG Postfach CH-9230 Flawil/Schweiz) with a 35° C. water bath to afford 38 g of a 20.0% solids urethane dispersion.

Preparation 10

Urethane Polymer Containing Quaternary Ammonium Groups

A 250 ml flask was charged with bis(2-hydroxyethyl)-dimethylammonium chloride available from Kodak, Rochester, N.Y. (0.1065 equivalents, 9.0 g) and dimethylformamide (53.9 g). The diol was dried by distilling 28 g of solvent. Isophorone diisocyanate (0.1012 equivalents, 11.2 g) and dibutyltin dilaurate (0.2 g) were added to the reaction. The reaction was heated at 80° C. for 3 hours whereupon there was no isocyanate present according to IR spectroscopy. The resulting polymer was precipitated in acetone (500 g) and filtered on a Büchner funnel. The polymer was diluted in water to 14.1% solids.

Preparation 11

Polyol Containing Sodium Sulfonate Groups

A reactor equipped with a mechanical stirrer, nitrogen purge, and distillation apparatus was charged with dimethyl-5-sodiosulfoisophthalate (6.0 kg, 40.51 equivalents), available from DuPont Chemicals; Wilmington, Del. and 600 molecular weight polyethylene glycol (48.5 kg, 161.67 equivalents), available from Union Carbide Corp.; Danbury, Conn. The reactor was heated to 175° C. and a vacuum was applied to the reactor. After 1.5 hours the vacuum was broken with nitrogen. Zinc acetate (80.0 g) was added and the mixture was heated to 221° C. and held for 3 hours while distilling methanol. The temperature was then reduced to 175° C. and vacuum was applied to the reaction mixture for one hour. The contents were subsequently cooled to 93° C. under nitrogen and drained to yield a clear, colorless liquid polyol. The OH equivalent weight of this polyol was found to be 433 g/mole OH. The theoretical sulfonate equivalent weight of the polyol mixture is 2570 g polymer/mole sulfonate.

Preparation 12

Urethane Polymer Containing Sodium Sulfonate Groups

A 500 ml flask was charged with the polyol of Preparation 11 (0.1314 equivalents, 55.9 g), poly(ethylene glycol) methyl ether of molecular weight 750 (0.0146 equivalents, 11 g) available from Aldrich Chemical Company, Inc., Milwaukee, Wis., glyceryl monostearate available from Pfaltz & Bauer, Inc. Waterbury, Conn. (0.0584 equivalents, 10.5 g), and 2-butanone (253.1 g). The polyols were dried by distilling 137.8 g of 2-butanone. Isophorone diisocyanate (0.2045 equivalents, 22.7 g), dibutyltin dilaurate (0.2 g), and 2-butanone (33.5 g) were added to the reaction, which was then heated at 78° C. for 32 hours. IR spectroscopy showed all of the isocyanate had been consumed. The product urethane solution was determined to be 42.3% solids.

A 500 ml flask was charged with a portion of this urethane solution (47.27 g) and water (80 g). The 2-butanone was distilled away to afford 100.29 g of waterborne product at 20.1% solids

Preparation 13

Butylmethacrylate Macromonomer Diol

To an amber quart bottle was added n-butyl methacrylate (200 g), mercaptopropanediol (3 g), VAZO-64 (3 g), and tetrahydrofuran (300 g). Nitrogen was bubbled through the solution for 4 minutes and a Teflon lined cap was screwed onto the bottle. The bottle was placed in water bath at 65° C. with agitation for 48 hours.

Preparation 14

Urethane Polymer Containing Sulfonate, Macromonomer and Fluorochemical Groups

A 500 ml flask was charged with the polyol of Preparation 11 (0.141 equivalents, 59.7 g), butylmethacrylate macromonomer of Preparation 13 (0.006 equivalents, 50.8 g based on solids), oleyl alcohol (0.011 equivalents, 3.0 g) and 2-butanone (237.8 g). The mixture was dried by distilling 177.9 g solvent then cooled. Isophorone diisocyanate (0.156 equivalents, 17.3 g), dibutyltin dilaurate (0.2 g), and 2-butanone (89.1 g) were added to the reaction which was heated at 79° C. until there was no isocyanate according to IR spectroscopy. (18 hours) The product urethane solution was 39.7% solids.

A portion of the urethane solution (50.4 g) and water (80.35 g) were charged to a 500 ml flask. The solvent was distilled using a Büchi ROTAVAPOR® model RE-111 with a 35° C. waterbath to afford a sample weight of 98.0 g at 18.9% solids.

Preparation 15

Polyol Containing Sodium Sulfonate Groups

A 1 gallon pressure kettle fitted with nitrogen purge, mechanical agitation, distillation hardware and vacuum capability was charged with dimethyl-5-sodiosulfoisophthalate (692.5 g, 4.67 equivalents) and Carbowax™ 600 (2807.5 g, 9.358 equivalents) available from Union Carbide Chemical and Plastics Company, Inc.; Danbury, Conn. The stirred mixture was heated for 90 minutes at 175° C. under 1.5 torr partial vacuum. Atmospheric pressure was restored with nitrogen purge and the temperature raised to 220° C. Zinc acetate (3.1 g) available from Aldrich Chemical Company, Milwaukee, Wis. dissolved in 20 g methanol was added. After two hours, the temperature was reduced to 175° C. and the pressure lowered to 2.0 torr. After an additional two hours, atmospheric pressure was restored with nitrogen purge. The clear, colorless batch was cooled to 140° C. and drained as a low viscosity liquid. Theoretical molecular weight: 1432; theoretical sulfonate equivalent weight: 1432 g polymer/mole sulfonate.

Preparation 16

Sulfonate Containing Polyurethane

Preparation 15 (177.0 g, 0.248 equivalents) was mixed with octadecyl isocyanate (73.0 g, 0.247 equivalents) available from Aldrich Chemical Co., Milwaukee, Wis., in a 500 ml 3-neck flask equipped with mechanical stir, thermometer and nitrogen purge. The mixture was heated with stirring to 70° C. Dibutyltin dilaurate (0.08 g) was added; a reaction exotherm to 85° C. batch temperature was observed lasting approximately 30 minutes. The batch temperature was held at 70° C. for an additional 5 hours. The batch was drained as a low viscosity liquid which solidified to a waxy solid upon cooling. Theoretical molecular weight: 2023 g/mole. Theoretical sulfonate equivalent weight: 2023 g polymer/mole sulfonate.

Preparation 17

Polyol Containing Sodium Sulfonate Groups

Preparation 17 was prepared according to the procedure used for Preparation 15 using the following reaction charges: dimethyl-5-sodiosulfoisophthalate (945.3 g, 6.38 equivalents) and Carbowax™ 400 (2554.7 g, 12.77 equivalents) available from Union Carbide Chemical and Plastics Company, Inc., Danbury, Conn., and zinc acetate (4.3 g) dissolved in 25 g methanol. The clear, colorless batch was cooled to 140° C. and drained as a low viscosity liquid. Theoretical molecular weight: 1032; theoretical sulfonate equivalent weight: 1032 g polymer/mole sulfonate.

II Dispersion Preparation

Examples 1–31 and Comparative Examples 1–4

Inkjet ink dispersions were prepared using the waterborne dispersant materials described above. These materials were combined with pigments, humectants, surfactants and water using the charges outlined in TABLE 1. The mixtures were milled according to the specified milling method designated in TABLE 1 which are described below.

Surfactants used were TRITON X-100 available from Union Carbide Corp.; Danbury, Conn.; FC-120 "FLUORAD®" Fluorochemical Surfactant FC-120 available from 3M Company, St. Paul, Minn., and SURFYNOL 465 available from Air Products and Chemicals Inc., Allentown, Pa.

TABLE 1

| Example No. | Dispersant Preparation No. | Color* | Pigment Weight [grams] | Sulfo** Humectant Weight [grams] | Dispersant Weight [grams] | Surfactant | Surfactant Weight [grams] | TMP Wt. [grams] | DEG Wt. [grams] | EG Wt. [grams] | Water Wt. [grams] | Milling Method |
|---|---|---|---|---|---|---|---|---|---|---|---|---|
| 1 | 1 | Y | 1.2 | 1.4 | 0.12 | TRITON X-100 | 0.4 | 1.2 | 4.8 | | 29 | B |
| 2 | 2 | Y | 2 | 1.4 | 2 | TRITON X-100 | 0.8 | 1.2 | 4.8 | | 18 | C |
| 3 | 2 | C | 2 | 1.4 | 2 | TRITON X-100 | 0.8 | 1.2 | 4.8 | | 18 | C |
| 4 | 2 | M | 2 | 1.4 | 2 | TRITON X-100 | 0.8 | 1.2 | 4.8 | | 18 | C |
| 5 | 3 | C | 3 | | 0.45 | TRITON X-100 | 1 | | | 23 | 73 | G |
| 6 | 3 | Y | 3.5 | | 0.45 | TRITON X-100 | 0.1 | | | 23 | 74 | G |

TABLE 1-continued

| Example No. | Dispersant Preparation No. | Color* | Pigment Weight [grams] | Sulfo** Humectant Weight [grams] | Dispersant Weight [grams] | Surfactant | Surfactant Weight [grams] | TMP Wt. [grams] | DEG Wt. [grams] | EG Wt. [grams] | Water Wt. [grams] | Milling Method |
|---|---|---|---|---|---|---|---|---|---|---|---|---|
| 7 | 3 | M | 3.5 | | 0.45 | TRITON X-100 | 1 | | | 23 | 72 | G |
| 8 | 4 | M | 5 | | 0.64 | TRITON X-100 | 2 | 8 | | 40 | 143 | H |
| 9 | 5 | Y | 2.4 | 2.8 | 0.69 | — | | 2.4 | | 9.6 | 62 | D |
| 10 | 5 | C | 1.2 | | 0.12 | FC-120 | 0.02 | 1.2 | 4.8 | | 32 | B |
| 11 | 5 | M | 1.2 | | 0.12 | FC-120 | 0.02 | 1.2 | 4.8 | | 32 | B |
| 12 | 6 | Y | 1.2 | 1.6 | 0.6 | FC-120 | 0.02 | 1.2 | 4.8 | | 22 | D |
| 13 | 6 | M | 2 | | 0.5 | FC-120 | 0.02 | 2.4 | 9.6 | | 66 | F |
| 14 | 6 | C | 1.2 | | 0.12 | FC-120 | 0.02 | 1.2 | 4.8 | | 32 | B |
| 15 | 8 | Y | 1.2 | | 0.12 | FC-120 | 0.02 | 1.2 | 4.8 | | 31 | B |
| 16 | 8 | M | 1.2 | | 0.12 | FC-120 | 0.02 | 1.2 | 4.8 | | 31 | B |
| 17 | 8 | C | 1.2 | | 0.12 | FC-120 | 0.02 | 1.2 | 4.8 | | 31 | B |
| 18 | 9 | C | 0.6 | | 0.6 | — | | 0.6 | 2.4 | | 16 | E |
| 19 | 9 | M | 0.6 | | 0.6 | — | | 0.6 | 2.4 | | 16 | E |
| 20 | 9 | Y | 0.6 | | 0.6 | — | | 0.6 | 2.4 | | 16 | E |
| 21 | 9 | K | 0.6 | | 0.6 | — | | 0.6 | 2.4 | | 16 | E |
| 22 | 10 | C | 0.6 | | 0.6 | — | | 0.6 | 2.4 | | 16 | E |
| 23 | 10 | M | 0.6 | | 0.6 | — | | 0.6 | 2.4 | | 16 | E |
| 24 | 10 | Y | 0.6 | | 0.6 | — | | 0.6 | 2.4 | | 16 | E |
| 25 | 10 | K | 0.6 | | 0.6 | — | | 0.6 | 2.4 | | 16 | E |
| 26 | 12 | C | 1.2 | | 0.24 | TRITON X-100 | 0.02 | 0.6 | 4.8 | | 33 | A |
| 27 | 12 | M | 1.2 | | 0.24 | TRITON X-100 | 0.02 | 0.6 | 4.8 | | 33 | A |
| 28 | 14 | Y | 0.6 | | 0.6 | TRITON X-100 | | 0.6 | 2.4 | | 16 | A |
| 29 | 14 | C | 1.2 | | 1.2 | TRITON X-100 | 0.02 | 0.6 | 4.8 | | 32.2 | A |
| 30 | 14 | M | 1.2 | | 1.2 | TRITON X-100 | 0.02 | 0.6 | 4.8 | | 32.2 | A |
| 31 | 16 | Y | 20 | 40*** | 13.3 | SURFYNOL 465 | 0.1 | — | — | — | 970 | I |
| Comp. Example 1 | | Y | 0.6 | | None | — | | | 2.4 | | 16 | E |
| Comp. Example 2 | | C | 0.6 | | None | — | | | 2.4 | | 16 | E |
| Comp. Example 3 | | K | 0.6 | | None | — | | | 2.4 | | 16 | E |
| Comp. Example 4 | | M | 0.6 | | None | — | | | 2.4 | | 16 | E |

*Pigment designations:
Y = Yellow Pigment FANCHON Fast Yellow Y-5688 obtained from Bayer Corporation - Industrial Chemicals Division, Rock Hill, South Carolina
M = Magenta Pigment QUINDO Magenta RV-6828 obtained ftom Bayer Corporation - Industrial Chemicals Division, Rock Hill, South Carolina
C = Cyan Pigment PALOMAR Blue B-4810 obtained from Bayer Corporation - Industrial Chemicals Division, Rock Hill, South Carolina
K = Black Pigment Spezialschwarz 4 (Special Black 4) obtained from Degussa Corporation - Pigments Group, Richfield Park, New Jersey
**Polyol of Preparation 11.
***Polyol of Preparation 17

MILLING METHODS OF TABLE 1

Method A

Charged a 5½ oz stainless steel mill with 100 g stainless steel milling media (3 mm), pigment, dispersant, and water. Milled on a Red Devil Paint mixer for 1 hour, let stand 10 minutes, milled an additional hour. Added surfactant, trimethylolpropane (TMP), and diethylene glycol (DEG). Milled an additional hour. Filtered the milling media from the ink with cheesecloth.

Method B

Charged a 5½ oz stainless steel mill with 100 g stainless steel milling media (3 mm), pigment, dispersant, surfactant, and water. Milled on a Red Devil Paint mixer for 1 hour, let stand 15 minutes, repeated once. Added TMP and DEG, milled one hour more. Filtered the milling media from the ink.

Method C

Charged a 5½ oz stainless steel mill with 100 g stainless steel milling media (3 mm), pigment, dispersant, Preparation 11, water and 2 drops triethanolamine. Milled on a Red Devil Paint mixer for 45 minutes, let stand 15 minutes, milled for an additional 45 minutes. Added remainder of ink components (Surfactant, TMP, and DEG) and milled 45 minutes. Filtered the milling media from the ink.

Method D

Charged a 5½ oz stainless steel mill with 100 g stainless steel milling media (3 mm), pigment, dispersant, Preparation 11, TMP, ethylene glycol or DEG, and water. Milled on a Red Devil Paint mixer for 1 hour, let stand 15 minutes, repeated twice. Filtered the milling media from the ink.

Method E

Charged the pigment, dispersant, DEG and water to a 9 dram glass vial filled half full with ceramic media (0.3–0.6 mm). Capped, placed on rollers over weekend at ~60 rpm.

Method F

Charged a 5½ oz stainless steel mill with 100 g stainless steel milling media (3 mm), pigment, dispersant, surfactant, TMP, DEG, and water all at once. Milled on a Red Devil Paint mixer for 1 hour, let stand 15 minutes, repeated twice for a total of 3 hours. Filtered the milling media from the ink.

Method G

Charged a 4 oz glass jar with dispersant, surfactant, water, ethylene glycol. Mixed, then added pigment. Mixed gently to avoid foam formation. Adjusted the pH to 8.5 with 1N NaOH. Dispersed using a sonic mixer (Misonix model XL2020 Sonicator available from Misonix Inc., Farmingdale, N.Y.) for 4 minutes at 176 watts. Centrifuged using a Sorvall GLC-2B General Laboratory Centrifuge at 2800 rpm for 30 minutes to remove large particles.

Method H

Same as Method G but used presscake pigment and after pigment addition, rolled on a roller mixer until all presscake lumps disappeared. After sonication, did not centrifuge.

Method I

Dispersant (10 g) was dissolved in deionized water (75 g) and was charged to a Silverson® high speed homogenizer (Silverson Machine Inc., East Longmeadows, Mass.). This concentrate was filtered through a 30 micron Teflon® membrane filter and charged to a M-110F MICROFLUIDIZER (available from MicroFluidics Inc., of Newton, Mass.) equipped to recirculate through a heat exchanger. The concentrate was processed continuously for 60 minutes at a pressure of 9500 psi at a temperature of 60–70 C.

Another mixture of dispersant (3.3 g) water (25 g) and humectant (40 g) was added to the concentrate. The concentrate was processed in the M-110 F for an additional 30 minutes at a pressure of 9,500 psi, followed by 5 minutes at 18,000 psi. The final concentrate was drained and filtered through a 1 micron Teflon® membrane filter to give a dispersion which was 13.4% solids. The ink concentrate was diluted to 3% solids (based on pigment plus dispersant) with deionized water using moderate homogenization with a Silverson® homogenizer mixer and surfactant was added.

The ink jet inks described in Table 1 were subsequently evaluated for printability and stability. These inks were evaluated by loading Hewlett Packard HP51626A cartridges with the ink after evacuating the chamber via syringe. These cartridges were then placed in an HP Deskjet 500® printer and print tested. Cartridges containing Example 31 were placed in an HP Deskjet 600® printer for print testing.

Stability was determined at room temperature and at an elevated temperature (65° C.). 1 milliliter aliquot samples of the ink jet ink dispersions were placed in 2 dram vials, capped, and placed for one week in a forced air oven at 65° C. Long term stability, as defined in Table 2, was determined at room temperature. Samples were determined to be stable if there was no evidence of flocculation, gelation, or phase separation. The results of the evaluations are described in Table 2.

TABLE 2

| Example No. | Dispersant Functional Group* | Mill Method | Color | Stability 1 wk at Room Temp. | Long Term Stability | Stable 1 wk at 65° C. | Ink Jet Print Testing** |
|---|---|---|---|---|---|---|---|
| 1 | COOM | C | Y | ✓ | >7 Mo. | ✓ | A |
| 2 | COOM | C | Y | ✓ | >8 Mo. | ✓ | A |
| 3 | COOM | C | C | ✓ | >8 Mo. | ✓ | C |
| 4 | COOM | C | M | ✓ | >8 Mo. | No | C |
| 5 | COOM | G | C | ✓ | >12 Mo. | ✓ | A |
| 6 | COOM | G | Y | ✓ | >12 Mo. | ✓ | A |
| 7 | COOM | G | M | ✓ | >12 Mo. | ✓ | A |
| 8 | COOM | H | M | ✓ | >12 Mo. | ✓ | A |
| 9 | COOM | D | Y | ✓ | >2 Mo. | ✓ | A |
| 10 | COOM | B | C | ✓ | >5 Mo. | ✓ | A |
| 11 | COOM | B | M | ✓ | >5 Mo. | ✓ | A |
| 12 | COOM | D | Y | ✓ | >4 Mo. | ✓ | A |
| 13 | COOM | F | M | ✓ | >3 Mo. | ✓ | A |
| 14 | COOM | B | C | ✓ | >5 Mo. | ✓ | E |
| 15 | COOM | B | Y | ✓ | >5 Mo. | ✓ | C |
| 16 | COOM | B | M | ✓ | >5 Mo. | ✓ | E |
| 17 | COOM | B | C | ✓ | >5 Mo. | ✓ | E |
| 18 | $OPO_3Na_2$ | E | C | ✓ | >1 wk. | ✓ | A |
| 19 | $OPO_3Na_2$ | E | M | ✓ | >1 wk. | ✓ | D |
| 20 | $OPO_3Na_2$ | E | Y | ✓ | >1 wk. | ✓ | A |
| 21 | $OPO_3Na_2$ | E | K | ✓ | >1 wk. | ✓ | A |
| 22 | $NR_3X$ | E | C | ✓ | >1 wk. | ✓ | A |
| 23 | $NR_3X$ | E | M | Gel | <1 day | No | B |
| 24 | $NR_3X$ | E | Y | Gel | <1 day | No | D |
| 25 | $NR_3X$ | E | K | Gel | <1 day | No | C |
| 26 | $SO_3M$ | A | C | ✓ | >8 Mo. | ✓ | B |
| 27 | $SO_3M$ | A | M | ✓ | >8 Mo. | ✓ | B |
| 28 | $SO_3M$ | A | Y | ✓ | >8 Mo. | No | B |
| 29 | $SO_3M$ | A | C | ✓ | >8 Mo. | ✓ | A |
| 30 | $SO_3M$ | A | M | ✓ | >8 Mo. | No | B |
| 31 | $SO_3M$ | I | Y | ✓ | | ✓ | A |
| Comparative Example1 | None | E | Y | No | No | No | Not Testable |
| Comparative Example2 | None | E | C | No | No | No | Not Testable |

TABLE 2-continued

| Example No. | Dispersant Functional Group* | Mill Method | Color | Stability 1 wk at Room Temp. | Long Term Stability | Stable 1 wk at 65° C. | Ink Jet Print Testing** |
|---|---|---|---|---|---|---|---|
| Comparative Example3 | None | E | K | No | No | No | Not Testable |
| Comparative Example4 | None | E | M | No | No | No | Not Testable |

*Dispersant Functional Group:
COOM = Carboxylate
SO$_3$M = Sulfonate
OPO$_3$Na$_2$ = Phosphonate
NR$_3$X = Quaternary ammonium
**Printability was rated according the following print quality judgments:
A - Essentially perfect printing of 10 pages
B - Some missing jets for the first few lines of each page, but the remainder of each page was essentially perfect
C - Printed 10 pages with some lost jets at the end
D - Printed several pages of decreasing quality then stopped printing
E - Printed less than one complete page.

What is claimed is:

1. A pigmented ink comprising a liquid medium and a pigment dispersed within the liquid medium, the pigment being stabilized within the liquid medium by a polyurethane dispersant, the polyurethane dispersant comprising a dispersant group, wherein the dispersant group contains up to approximately 11% by weight of monovalent polyethylene oxide units, and being present in the ink in an amount by weight of not more than 200% of the weight of the pigment, the ink being suitable for use in an ink jet printer.

2. The ink of claim 1, wherein the polyurethane dispersant comprises a polyurethane backbone comprising a pendant dispersing group.

3. The ink of claim 2, wherein the pendant dispersing group is chosen from the group consisting of a carboxylate, a phosphate, a phosphonate, a sulfonate, a quaternary ammonium, and mixtures thereof.

4. The ink of claim 1, wherein the polyurethane dispersant, with urethane linkages represented as X, has the formula:

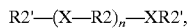

wherein
n can be zero or greater,
each R2 can independently comprise a multivalent organic group comprising a substituted or unsubstituted, straight or branched, saturated or unsaturated aryl or aliphatic group independently and optionally substituted with halogen and optionally containing one or more heteroatom-containing chemical moiety, and
each R2' can independently comprise a monovalent organic group comprising a substituted or unsubstituted, straight or branched, saturated or unsaturated aryl or aliphatic group, independently and optionally substituted with halogen, and optionally containing one or more heteroatom-containing chemical moiety.

5. The ink of claim 4, wherein one or more of an R2 or R2' includes a non-ionic hydrophilic segment.

6. The ink of claim 5, wherein the non-ionic hydrophilic segment comprises a polyoxyalkylene oxide segment.

7. The ink of claim 5, wherein the non-ionic hydrophilic segment is of the general formula:

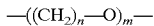

wherein n is from 2 to 4, and m is from 5 to 400.

8. The ink of claim 4, wherein one or more of an R2 or R2' comprises an ionic group chosen from the group consisting of a carboxylate, a phosphate, a phosphonate, a sulfonate, a quaternary ammonium, and mixtures thereof.

9. The ink of claim 4, wherein one or more of an R2 or R2' comprises a pendant fluorinated group.

10. The ink of claim 9, wherein the pendant fluorinated group comprises a fluorinated aliphatic group optionally containing one or more of a divalent oxygen, carbonyl oxygen, trivalent nitrogen, or divalent sulfur.

11. The ink of claim 9, wherein the pendant fluorinated group comprises a non-fluorinated group linking the fluorinated group to the polyurethane backbone:

wherein —R3— comprises a non-fluorinated linking group and R$_f$ comprises a fluoroalkyl.

12. The ink of claim 1, wherein the polyurethane dispersant has a number average molecular weight in the range from about 1,000 to 100,000.

13. The ink of claim 1, wherein the polyurethane dispersant has a dispersing group equivalent weight in the range from about 150 to 5,000.

14. The ink of claim 1, wherein the polyurethane dispersant comprises monomeric units derived from monomers comprising an isocyanate and an alcohol.

15. The ink of claim 14, wherein the isocyanate includes one or more isocyanates chosen from the group consisting of: an alkyl isocyanate, an aryl isocyanate, diphenylmethane diisocyanate, isophorone diisocyanate, toluene diisocyanate, hexamethylene diisocyanate, tetramethylxylene diisocyanate, p-phenylene diisocyanate, hydrogenated diphenylmethane diisocyanate, sulfonated toluene diisocyanate, sulfonated diphenylmethanediisocyanate, and mixtures thereof.

16. The ink of claim 14, wherein the alcohol is chosen from the group consisting of: ethylene glycol; propylene glycol; 1,3-propanediol; 1,4-butanediol; 1,5-pentanediol; 1,6-hexanediol; 1,2-hexadecanediol; 1,2-dodecanediol, glycerol monoesters or diesters of fatty acids, neopentyl glycol; diethylene glycol; dipropylene glycol; 2,2,4-trimethyl-1,3-pentanediol; 1,4-cyclohexanedimethanol; ethylene oxide and/or propylene oxide adducts of bisphenol A; ethylene oxide and/or propylene oxide adduct of hydrogenated bisphenol A, trimethylolpropane, trimethylolethane, a polyester diol, a polyether diol, a polycarbonate diol, a polypropylene oxide, a polytetramethylene oxide, a polycaprolactone diol, an aliphatic polycarbonate diol, and mixtures thereof.

17. The ink of claim 14, wherein the alcohol comprises a pendant dispersing group chosen from the group consisting of a carboxylate, a phosphate, a phosphonate, a sulfonate, a quaternary ammonium, and mixtures thereof.

18. The ink of claim 17, wherein the alcohol comprises a carboxylic acid alcohol of the general formula:

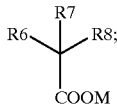

wherein at least one of R6, R7, or R8 is independently a hydroxy-functional organic group and M is a monovalent metal ion, ammonium salt $NR_4^+$, or $H^+$.

19. The ink of claim 18, wherein the alcohol comprises dimethylolpropionic acid.

20. The ink of claim 17, wherein the alcohol comprises a compound of the general formula:

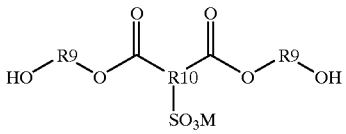

wherein R9 comprises a linear and branched aliphatic group, R10 comprises an alkyl, aryl, or aralkyl group, and M comprises a cation.

21. The ink of claim 17, wherein the alcohol comprises a compound of the general formula:

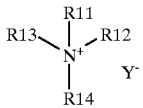

wherein R11 and R12 independently comprise hydroxy-functional organic groups, R13 and R14 independently comprise alkyl, aryl, or aralkyl groups, and, Y is a monovalent anion.

22. The ink of claim 14, wherein the alcohol comprises a fluoroaliphatic alcohol.

23. The ink of claim 14, wherein the alcohol comprises a fluoroalkyl sulfonamide.

24. The ink of claim 14, wherein the alcohol has the general structure:

where n ranges from 1 to about 18 and one or both of R4 and R5 comprises an alcohol.

25. The ink of claim 14, wherein the alcohol has the general structure:

where n and m independently range from 1 to about 18.

26. The ink of claim 14, wherein the alcohol is chosen from the group consisting of $C_8F_{17}SO_2N(C_2H_4OH)(CH_2CH_3)$, $C_8F_{17}SO_2N(C_2H_4OH)_2$, $C_6F_{13}CH_2CH_2OH$, $C_8F_{17}CH_2CH_2OH$, $C_{10}F_{21}CH_2CH_2OH$, and mixtures thereof.

27. The ink of claim 1, wherein the liquid medium is substantially free of organic solvent.

28. The ink of claim 1, wherein the liquid medium comprises from 75 to 100% by weight water.

29. The ink of claim 1, wherein the liquid medium consists essentially of water.

30. An ink delivery system, comprising an ink jet cartridge and ink according to claim 1.

31. The ink of claim 1 wherein the polyurethane dispersant is adsorbed onto the pigment.

32. The ink of claim 31 wherein the polyurethane dispersant is present in the ink in an amount by weight not greater than the amount by weight pigment.

33. The ink of claim 31 wherein the polyurethane dispersant is present in the ink in an amount by weight not greater than the half the amount by weight pigment.

34. The ink of claim 1, wherein the liquid medium consists of organic solvent.

35. A method of stabilizing an ink suitable for use in an ink jet printer, the ink comprising a liquid medium and a pigment, the method comprising the step of adding a polyurethane dispersant wherein the plyurethane dispersant comprises a dispersant group, wherein the dispersant group contains up to approximately 11% by weight of monovalent polyethylene oxide units, and being present in the ink in an amount by weight of not more than 200% of the weight of the pigment.

36. The method of claim 35 wherein the polyurethane dispersant adsorbs onto the pigment.

37. The method of claim 35 wherein the polyurethane dispersant is added in an amount by weight of not more than 300% of the weight of the pigment.

38. The method of claim 35 wherein the polyurethane dispersant is added in an amount by weight of not more than 200% of the weight of the pigment.

39. The method of claim 35 wherein the polyurethane dispersant is added in an amount by weight not greater than the amount by weight pigment.

40. The method of claim 35 wherein the polyurethane dispersant is added to the ink in an amount by weight not greater than half the amount by weight pigment.

41. The method of claim 35, wherein the polyurethane dispersant comprises a polyurethane backbone comprising a pendant dispersing group.

42. The method of claim 41, wherein the pendant dispersing group is chosen from the group consisting of a carboxylate, a phosphate, a phosphonate, a sulfonate, a quaternary ammonium, and mixtures thereof.

43. The method of claim 35, wherein the polyurethane dispersant, with urethane linkages represented as X, has the formula:

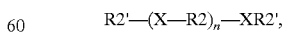

wherein n can be zero or greater, each R2 can independently comprise a multivalent organic group comprising a substituted or unsubstituted, straight or branched, saturated or unsaturated aryl or aliphatic group independently and optionally substituted with halogen and optionally containing one or more heteroatom-containing chemical moiety, and each R2' can independently comprise a monovalent organic group comprising a substituted or unsubstituted, straight or branched, saturated or unsaturated aryl or aliphatic group, independently and optionally substituted with halogen, and optionally containing one or more heteroatom-containing chemical moiety.

44. The method of claim 43, wherein one or more of an R2 or R2' includes a non-ionic hydrophilic segment.

45. The method of claim 44, wherein the non-ionic hydrophilic segment comprises a polyoxyalkylene oxide segment.

46. The method of claim 44, wherein the non-ionic hydrophilic segment is of the general formula:

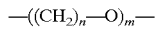

wherein n is from 2 to 4, and m is from 5 to 400.

47. The method of claim 43, wherein one or more of an R2 or R2' comprises an ionic group chosen from the group consisting of a carboxylate, a phosphate, a phosphonate, a sulfonate, a quaternary ammonium, and mixtures thereof.

48. The method of claim 43, wherein one or more of an R2 or R2' comprises a pendant fluorinated group.

49. The method of claim 48, wherein the pendant fluorinated group comprises a fluorinated aliphatic group optionally containing one or more of a divalent oxygen, carbonyl oxygen, trivalent nitrogen, or divalent sulfur.

50. The method of claim 48, wherein the pendant fluorinated group comprises a non-fluorinated group linking the fluorinated group to the polyurethane backbone:

wherein —R3— comprises a non-fluorinated linking group and $R_f$ comprises a fluoroalkyl.

51. The method of claim 35, wherein the polyurethane dispersant has a number average molecular weight in the range from about 1,000 to 100,000.

52. The method of claim 35, wherein the polyurethane dispersant has a dispersing group equivalent weight in the range from about 150 to 5,000.

53. The method of claim 35, wherein the polyurethane dispersant comprises monomeric units derived from monomers comprising an isocyanate and an alcohol.

54. The method of claim 53, wherein the isocyanate includes one or more isocyanates chosen from the group consisting of: an alkyl isocyanate, an aryl isocyanate, diphenylmethane diisocyanate, isophorone diisocyanate, toluene diisocyanate, hexamethylene diisocyanate, tetramethylxylene diisocyanate, p-phenylene diisocyanate, hydrogenated diphenylmethane diisocyanate, sulfonated toluene diisocyanate, sulfonated diphenylmethanediisocyanate, and mixtures thereof.

55. The method of claim 53, wherein the alcohol is chosen from the group consisting of: ethylene glycol; propylene glycol; 1,3-propanediol; 1,4-butanediol; 1,5-pentanediol; 1,6-hexanediol; 1,2-hexadecanediol, 1,2-dodecanediol, glycerol monoesters or diesters of fatty acids, neopentyl glycol; diethylene glycol; dipropylene glycol; 2,2,4-trimethyl-1,3-pentanediol; 1,4-cyclohexanedimethanol; ethylene oxide and/or propylene oxide adducts of bisphenol A; ethylene oxide and/or propylene oxide adduct of hydrogenated bisphenol A, trimethylolpropane, trimethylolethane, a polyester diol, a polyether diol, a polycarbonate diol, a polypropylene oxide, a polytetramethylene oxide, a polycaprolactone diol, an aliphatic polycarbonate diol, and mixtures thereof.

56. The method of claim 53, wherein the alcohol comprises a pendant dispersing group chosen from the group consisting of a carboxylate, a phosphate, a phosphonate, a sulfonate, a quaternary ammonium, and mixtures thereof.

57. The method of claim 56, wherein the alcohol comprises a carboxylic acid alcohol of the general formula:

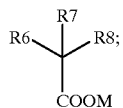

wherein at least one of R6, R7, or R8 is independently a hydroxy-functional organic group and M is a monovalent metal ion, ammonium salt $NR_4^+$, or $H^+$.

58. The method of claim 57, wherein the alcohol comprises dimethylolpropionic acid.

59. The method of claim 56, wherein the alcohol comprises a compound of the general formula:

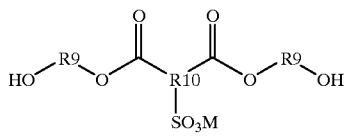

wherein R9 comprises a linear and branched aliphatic group, R10 comprises an alkyl, aryl, or aralkyl group, and M comprises a cation.

60. The method of claim 56, wherein the alcohol comprises a compound of the general formula:

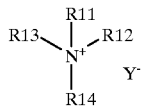

wherein R11 and R12 independently comprise hydroxy-functional organic groups, R13 and R14 independently comprise alkyl, aryl, or aralkyl groups, and, Y is a monovalent anion.

61. The method of claim 53, wherein the alcohol comprises a fluoroaliphatic alcohol.

62. The method of claim 53, wherein the alcohol comprises a fluoroalkyl sulfonamide.

63. The method of claim 53, wherein the alcohol has the general structure:

where n ranges from 1 to about 18 and one or both of R4 and R5 comprises an alcohol.

64. The method of claim 53, wherein the alcohol has the general structure:

where n and m independently range from 1 to about 18.

65. The method of claim 53, wherein the alcohol is chosen from the group consisting of $C_8F_{17}SO_2N(C_2H_4OH)$ ($CH_2CH_3$), $C_8F_{17}SO_2N(C_2H_4OH)_2$, $C_6F_{13}CH_2CH_2OH$, $C_8F_{17}CH_2CH_2OH$, $C_{10}F_{21}CH_2CH_2OH$, and mixtures thereof.

66. The method of claim 35, wherein the liquid medium is substantially free of organic solvent.

67. The method of claim 35, wherein the liquid medium comprises from 75 to 100% by weight water.

68. The method of claim 35, wherein the liquid medium consists essentially of water.

* * * * *